United States Patent
Huang (10) Patent No.: US 7,257,717 B2
(45) Date of Patent: Aug. 14, 2007

(54) METHOD WITH THE FUNCTIONS OF VIRTUAL SPACE AND DATA ENCRYPTION AND INVISIBILITY

(75) Inventor: Charles Huang, Hsin-Chu (TW)

(73) Assignee: Fineart Technology Co., Ltd, Hsin-Chu (TW)

(*) Notice: Subject to any disclaimer, the term of this patent is extended or adjusted under 35 U.S.C. 154(b) by 793 days.

(21) Appl. No.: 10/403,293

(22) Filed: Apr. 1, 2003

(65) Prior Publication Data
US 2004/0199779 A1    Oct. 7, 2004

(51) Int. Cl.
*G06F 11/30* (2006.01)
*G06F 12/14* (2006.01)
*H04L 9/32* (2006.01)

(52) U.S. Cl. ........................................ 713/193
(58) Field of Classification Search ................ 713/193
See application file for complete search history.

(56) References Cited

U.S. PATENT DOCUMENTS 5,894,425 A * 4/1999 Saliba ........................ 710/62
5,968,142 A * 10/1999 Frederic ...................... 710/18
7,036,020 B2 * 4/2006 Thibadeau .................. 713/193

FOREIGN PATENT DOCUMENTS

WO    WO 9710566 A1 *   3/1997

OTHER PUBLICATIONS

Smart Computing in Plain English, Security Software; Jul. 1999—vol. 7 Issue 7; 8 Pages, retrieved date Aug. 28, 2006.*

* cited by examiner

*Primary Examiner*—Gilberto Barron, Jr.
*Assistant Examiner*—Samson Lemma
(74) *Attorney, Agent, or Firm*—Alan Kamrath; Kamrath & Associates PA

(57) ABSTRACT

A method with the functions of virtual space and data encryption and invisibility stores file data as encrypted code through an encryption mechanism. Data can be read through an embedded data storage device only. Furthermore, a specific path of data stored on the data process apparatus can be concealed. Dual security for enhancing data security and confidentiality is utilized to achieve the object of data security management.

19 Claims, 7 Drawing Sheets

METHOD WITH THE FUNCTIONS OF VIRTUAL SPACE AND DATA ENCRYPTION AND INVISIBILITY

BACKGROUND OF THE INVENTION

1. Field of the Invention

The present invention relates to an embedded data storage device and especially to a device that applies a data process apparatus with a method of virtual space and data encryption and invisibility functions.

2. Related Art

The development of technology has made progress at a tremendous pace at the present days, and data process apparatuses have been widely applied to various fields. With the advance in science, the functions of data process apparatuses are increasingly diversified. In today's information explosive world, a data process apparatus is required to not only provide various functions for a user to manage his/her information but also to have sufficient space for a hoard of data storage.

According to the aforementioned situation, a portable data storage device has become one of the indispensable accessories of a data process apparatus accommodating to the mobility era. However, a portable data storage device is convenient to be carried though, but the drawback thereof is that limited storage space is unable to store a legion of information. For instance, a floppy disk is gradually superseded, due to its insufficient storage space. In view of the foregoing, some developments of conventionally known technologies in Micro Drivers, Memory Sticks (MS), etc., aim at achieving the function of storing a hoard of data or information. Nevertheless, there is no obvious effect on the function of data protection. The attached list describes known data security system categories as well as some drawbacks thereof. Both enterprises and individuals require their own confidential data and files to be securely stored and presently used methods are through password mechanisms or software methods. Therefore, how to enable a data storage device to possess the highly secured function to be executed by the hardware apparatus thereof has become a technical subject to be resolved.

SUMMARY OF THE INVENTION

In view of the foregoing, the invention presents a method with the functions of virtual space and data encryption and invisibility. The main object of the invention aims at preventing confidential data, files and application programs, which are installed on a virtual database in a data process apparatus or an embedded data storage device, from being thieved or used by plotters through concealing used data paths, file information and journey by way of detecting, copying and pasting, moving and deleting data. In addition, all data stored into the data process apparatus or the embedded data storage device can be encrypted through a virtual hard drive On-the-fly Encryption technique, so that data content can be read only when required. Various passwords correspond to different embedded data storage devices without relations. The said decryption device of the invention is an embedded data storage device, which only enables data to be encrypted at the belonged data process apparatus, i.e., each embedded data storage device is correspondent to a specific data process apparatus thereof.

The disclosed method of the invention aims at achieving the objective of private data security through the protection of dual security patterns to protect important data of a user, so that the data storage device, even though it is lost, is unable to be applied by other people to other kind of data processing apparatus. The invention includes at least the following steps: installing an embedded data storage device on a data process apparatus, establishing at least one virtual database on the data process apparatus, setting up the virtual database through a user end, storing a data file into the virtual database, detecting if the embedded data storage device is still on the data process apparatus, and hiding a specific path that displays the data file whereabouts on the data process apparatus.

The detailed descriptions of the preferred embodiments are followed by the brief descriptions of the drawings below.

BRIEF DESCRIPTION OF THE DRAWINGS

The invention will become more fully understood from the detailed description given hereinbelow. However, the

TABLE 1

| Categories | Programs | Description | Drawbacks |
| --- | --- | --- | --- |
| Security cabinet (security directory) | Security disk, i-key | Files can be dragged into specific directories for encryption, and dragged out for decryption | A file or program should be decrypted outside the specific directory, then be dragged back to the directory after being operated, clear text outside the directory shall be deleted |
| A file to be encrypted into another file | e.g. WinZip, etc. that will change filenames | Usually clicks mouse right button to carry out data encryption/decryption | Ditto, but more inconvenient to be operated |
| A file to be generated and encrypted by the system | Word, Excel, etc. | Password is required before opening a file | only specific files (generated by the system) can be encrypted, but easily to be decrypted by many programs |
| Transparent encryption/decryption | GoodLock | Encrypted files can retain the same file names, and are operated the same as general files, if the smart card exists; or files can not be read | only data can be encrypted; encrypted data can be stored anywhere to a hard disk | following description is for purposes of illustration only, and thus does not limit the invention, wherein:

FIGS. 2-a, 2-b, and 2-c are flowcharted diagrams of the method with the functions of virtual space and encrypted data invisibility according to the present invention;

FIGS. 3-a and 3-b are user interfaces of the method with the functions of virtual space and encrypted data invisibility according to the present invention; and FIGS. 4-a, 4-b, 4-c, and 4-d are embodiment views of the method with the virtual space and encrypted data invisibility functions according to the present invention.

DETAILED DESCRIPTION OF THE PREFERRED EMBODIMENTS

Figure 1:
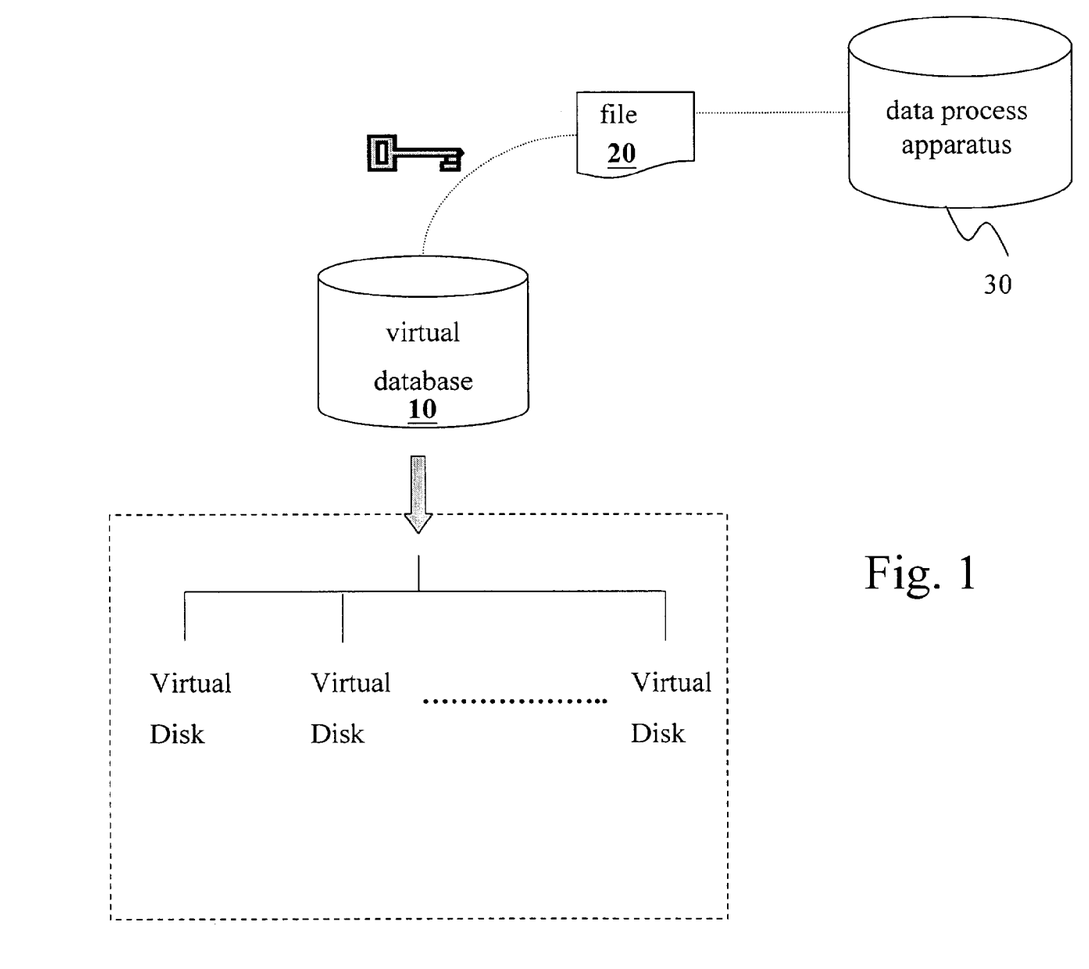
FIG. 1 is a schematic diagram of a method with the functions of virtual space and encrypted data invisibility according to the present invention.

The present invention is a method with the functions of virtual space and encrypted data invisibility. Referring to FIG. 1, the present invention enables the start-up of the apparatuses after an embedded data storage device is installed into a data process apparatus 30. Both said data process apparatus 30 and embedded data storage device are able to provide a virtual database 10 for securing confidential data files and important information. When a file 20 is stored by a user in the virtual database 10, the file 20 is encrypted based on a kind of encryption technique. Therefore, the user is able to read the clear text of the file under the file reading process only. The virtual database 10 retrieves and records the file situations while the file paths and journeys are stored back to the data process apparatus 30. In addition, the virtual database 10 conceals all information for preventing data from being used by others when the embedded data storage device is removed from the data process apparatus. As shown in the drawing, a plurality of virtual database 10 (virtual disk) can be established for storing different data and managing data through various setting modes, where the file 20 can be a specific item to be processed by an application program.

The said embedded data storage device is connected to the data process apparatus 30 through a connection interface, which can be either an IEEE 1394, or a USB interface. The data process apparatus 30 can be any computer controlled hardware platform, such as a PC (Personal Computer), a NB (Notebook), or a PDA (Personal Digital Assistant), a mobile phone or a handheld data process apparatus. Moreover, the embedded data storage device can be a portable storage device, an IC (Integrated Circuit) Card, or a smart card.

Figure 2A:
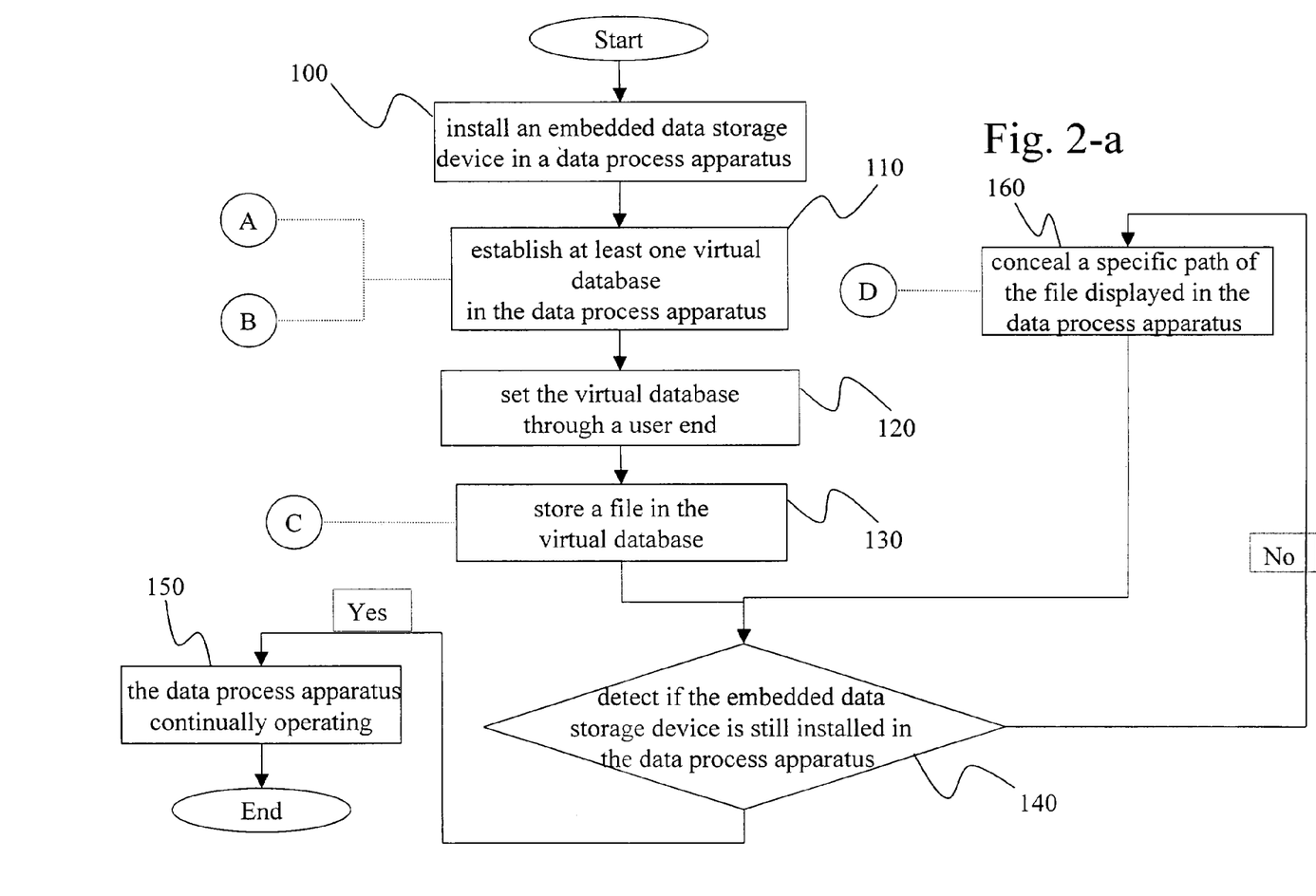
Figure 2B:
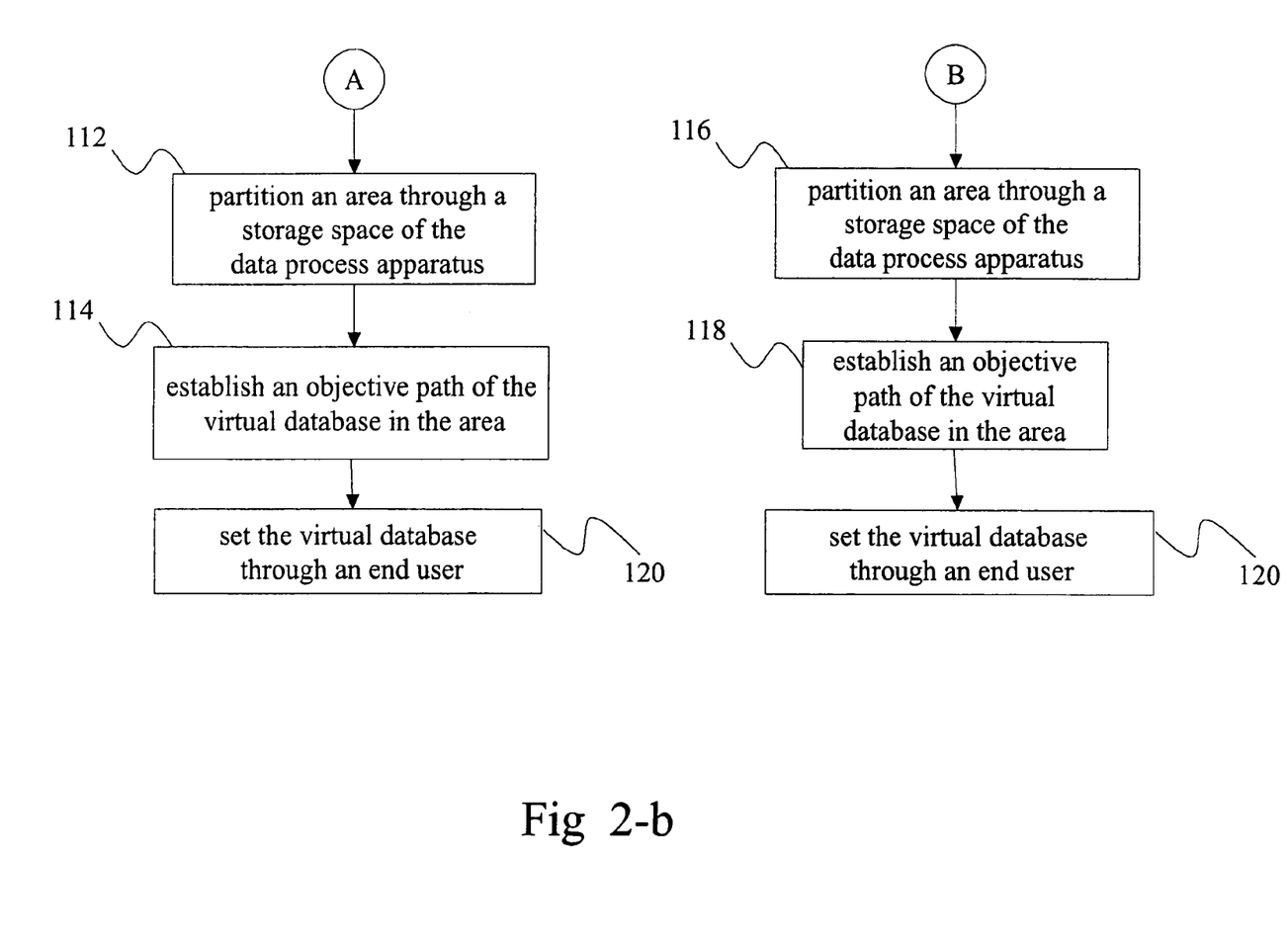

Referring to FIGS. 2-a and 2-b, the present invention installs an embedded data storage device into a data process apparatus 30 (step 100). After the installation, at least one virtual database 10 is established on the data process apparatus or the embedded data storage device (step 110). Then, the virtual database 10 is set up by an end user (step 120), and the setup consists of four modes, which will be further described thereinafter. Following the setup, the invention enables a file 20 to be stored to the virtual database 10 (step 130) and detects if the data process apparatus 30 is still equipped with the embedded data storage device (step 140). If YES, the data process apparatus 30 resumes the normal operation (step 150), and the invention ends up the flow. If NO, the specific path display of the file 20 in the data process apparatus 30 is concealed, and then, the flow goes back to step 140 for carrying out the detecting process and repeating the above flow until the flow is completed.

The said four modes include a loaded/unloaded mode, a space management mode, a password mode, and a backup/restore mode. The details are described as follows.

1. The loaded/unloaded mode: to enable or disable the user end to use a specific virtual database 10. A plurality of virtual databases 10 can be generated in the data process apparatus 30 by the user, but the numbers of the virtual databases 10 being simultaneously loaded are limited. Each virtual database 10 is enabled to be used while under the loaded status only.

2. The space management mode: to enable the user to change the space size of the virtual database 10. The mode is able to give a command for expanding the storage space, if the space size of the virtual database is insufficient for use, whereas the hard disk is still big enough.

3. The password mode: to provide a rescue password for security controlling if the end user loses the embedded data storage device, and further limits specific rescue times and enters into the read-only status of the virtual database 10. The rescue password enables the user to use the virtual database 10 when required, once the embedded data storage device is temporarily unreachable. However, a limitative use does not allow any data to be added into the virtual database 10.

4. The backup/restore mode: to enable required data by the user to be made into a backup from the virtual database 10 to the data process apparatus 30. The restore mode enables data to be restored from the data process apparatus 30 to the virtual database 10. It can be of benefit if data backup is frequently carried out, and backup data can be restored for use, if required. "Backup" can compress the whole virtual database 10 into a .zip file to be stored in directories appointed by the user.

"Restore" can restore the .zip file generated by "backup" into a file of the virtual database 10 to be stored in directories appointed by the user and the filename remains unchanged.

Processes A and B, the detailed flows of establishing a virtual database 10, of the invention are described herein. Process A is to establish the virtual database 10 in the data process apparatus 30 of step 110. Process B is to establish the virtual database 10 in the embedded data storage device of step 110. Only one process can be carried out at one time, either process A or B, and the user can assign an area established in the virtual database 10 as shown in FIG. 2-b.

Following process A, the present invention enables a storage space provided by the data process apparatus 30 to partition an area (step 112). The said storage space can be a HD (Hard Disk) and the said area is comprised of logical (virtual) memory blocks. After the partition process, an objective path of the virtual database 10 is established in the area (step 114). The present invention enables the space size of the virtual database 10 to be changed, and confidential data to be concealed.

If the user chooses to carry out process B, the present invention enables a storage space provided by the embedded data storage device to partition an area (step 116). After the partition process, an objective path of the virtual database 10 is established in the area (step 118). The present invention enables the space size of the virtual database 10 to be changed, and confidential data to be concealed.

The data process apparatus, mentioned at the step 110 of establishing at least a virtual database 10 on the data process apparatus, can be replaced with the embedded data storage device. Process A and process B can not be carried out at the same time.

Figure 2C:
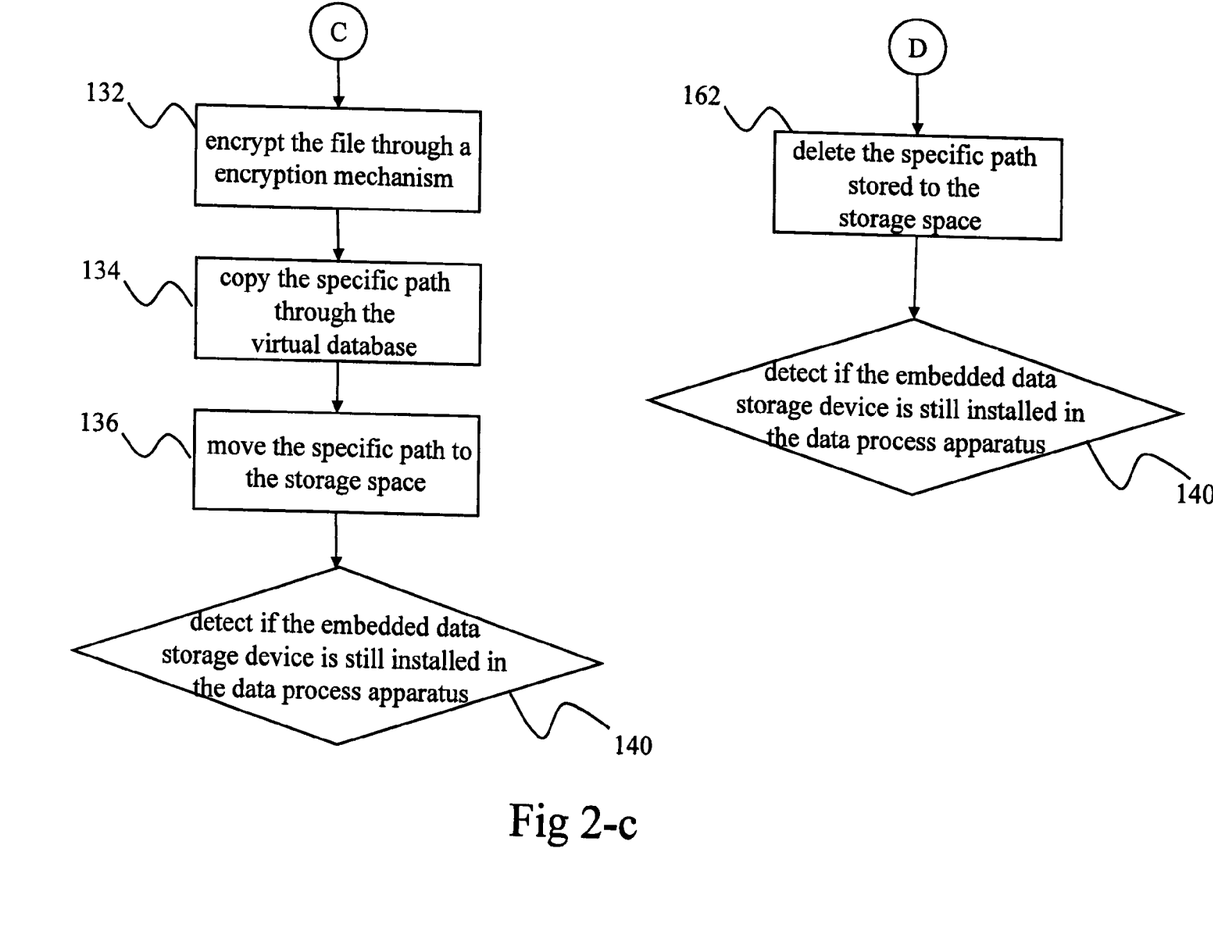

Process C, the detailed flow of storing the file 20 into the virtual database 10, and process D, the detailed flow of concealing the specific path of the file 20, are described as follows referring to FIG. 2-c.

Following process C, the file 20 is encrypted through a data encryption mechanism (step 132), which mechanism is a kind of virtual drive On-the-fly Encryption technique. The specific path of the data file is copied through the virtual database 10 (step 134). After the data copy process is completed, the specific path is moved to the storage space (step 136).

Following process D, the specific path, which is any information and journey of the file left in the data process apparatus 30, in the storage space is deleted (step 162). The invention, therefore, is able to achieve the object of hiding all information and journey of the data files 20.

The said virtual drive On-the-fly Encryption technique is applied to automatically decrypt data, prior to the process of reading data from a HD. On the contrary, it automatically encrypts data before the data is stored to a HD. The whole encryption and decryption processes are transparent, so that a user does not need to remember whether the file content is a clear text or an encrypted code. The operation of the present invention is the same as that of general practices. Further, the clear text can be read only at the moment when the data is required by the program, or data in the HD always remains as encrypted code. The necessary condition for decrypting data is when the data process apparatus 30 is equipped with the embedded data storage device.

Figure 3A:
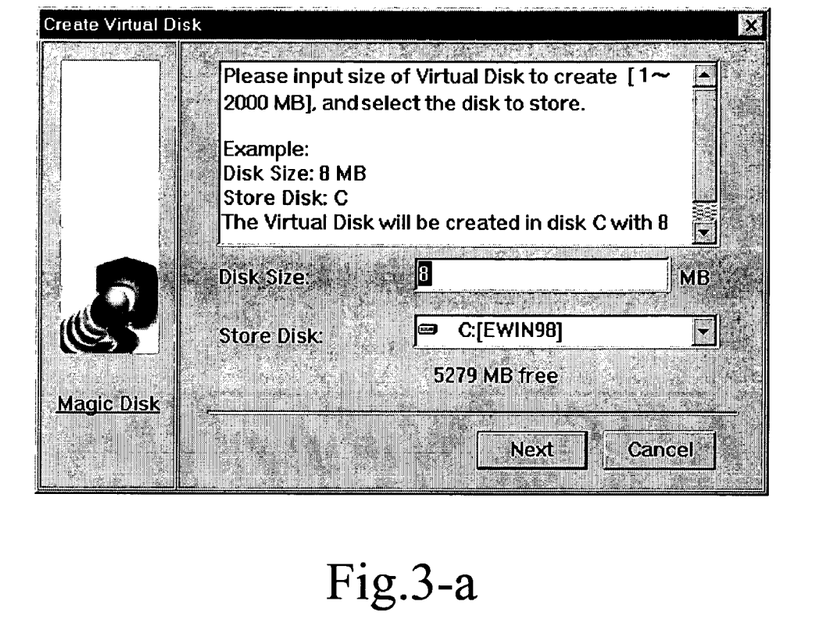
Figure 3B:
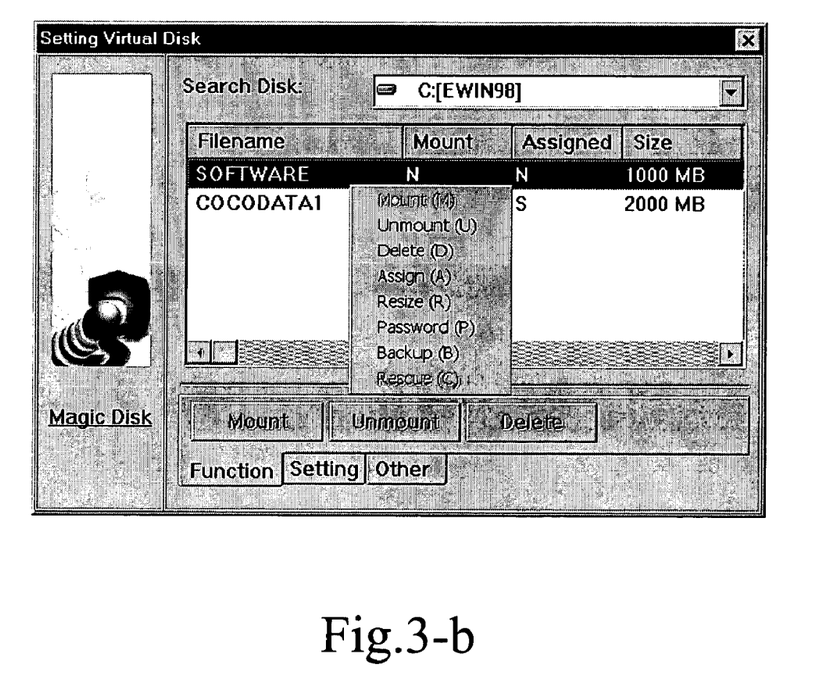
Figure 4A:
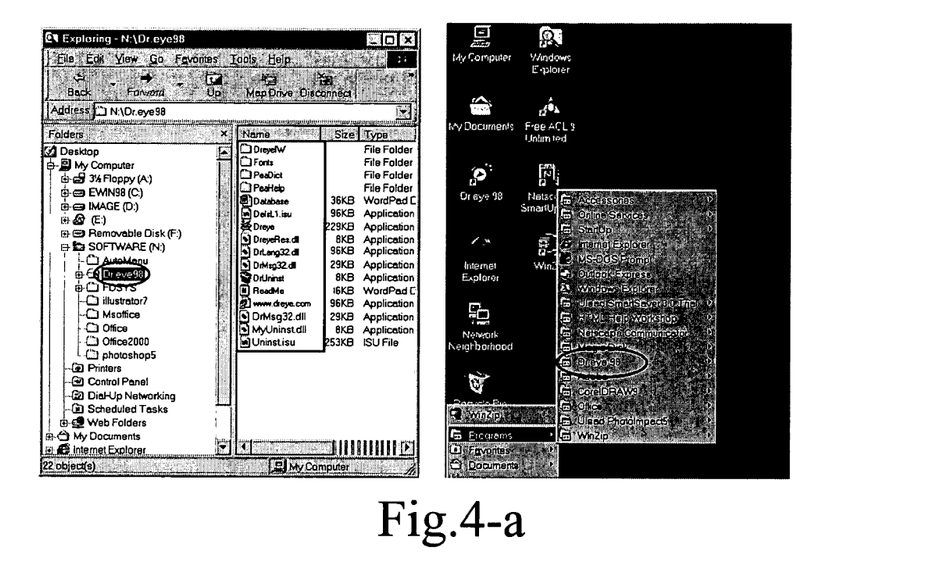
Figure 4B:
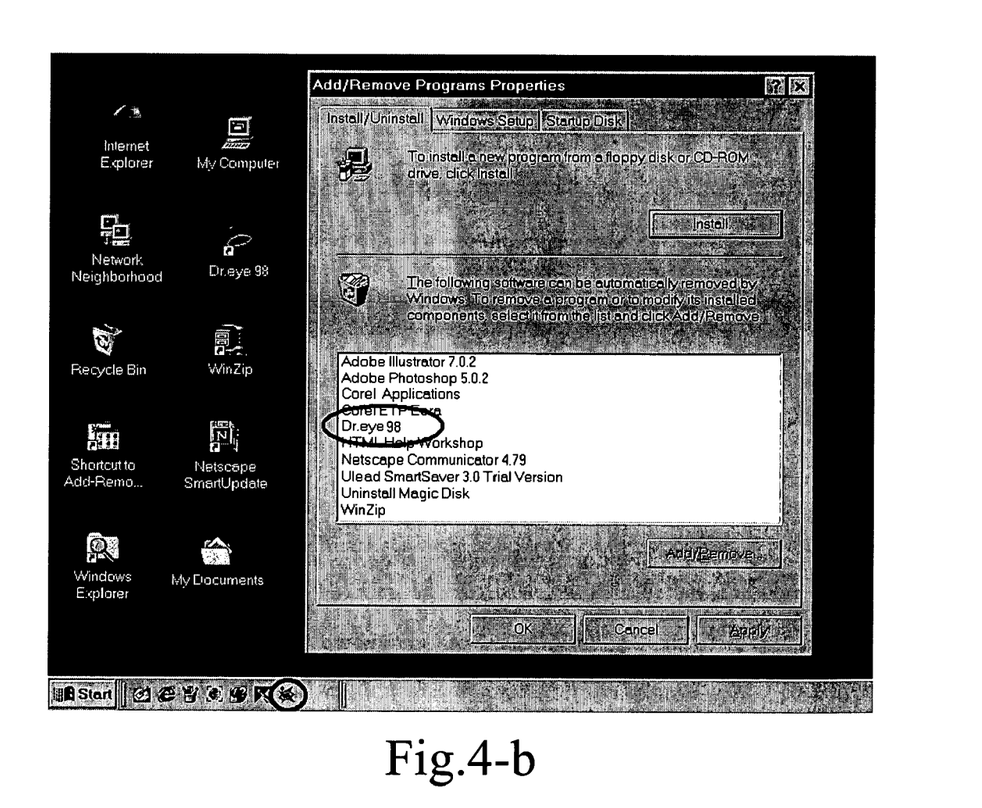
Figure 4C:
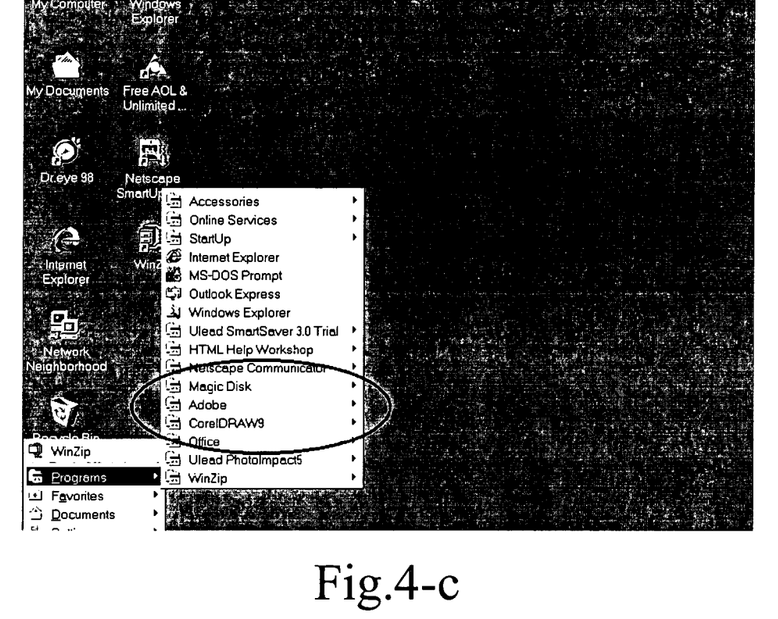
Figure 4D:
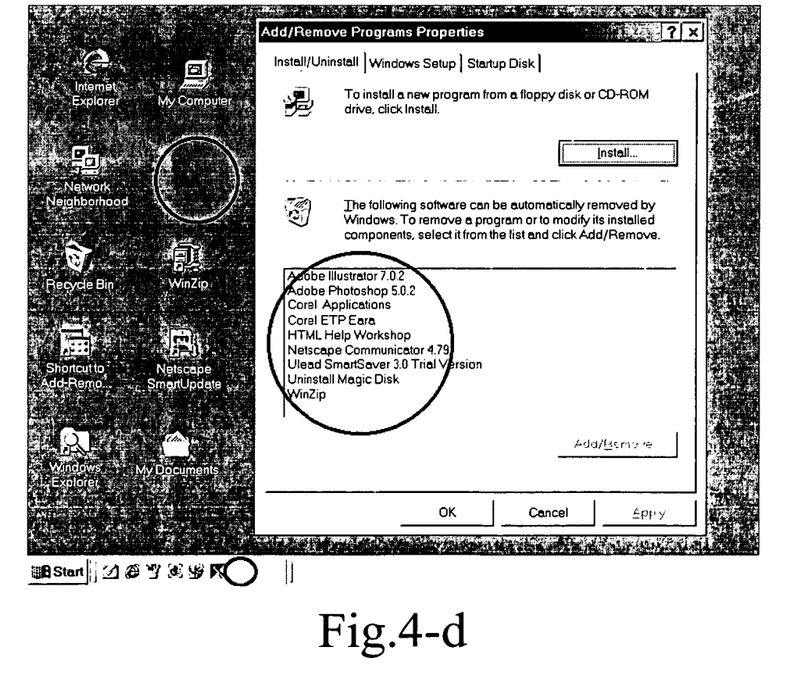

FIGS. 3-a and 3-b are user interfaces of the method with the functions of virtual space and encrypted data invisibility according to the invention. The drawings indicate that the user can utilize various functions of the invention for carrying out the operations after establishing and setting up the interface of the virtual database 10. FIGS. 4-a, 4-b, 4-c, and 4-d are embodiment views of the method with the functions of virtual space and encrypted data invisibility according to the present invention.

Through the embodiments, the present invention can be readily understood and especially the specific path mentioned at step 160. The specific path of the embodiment is a necessary path under the Microsoft Windows Operation system. However, it is to be understood that the disclosed embodiments are merely exemplary of the invention, and there are different paths required to be concealed under different operation systems to achieve the effect of the invention. If a user requires obtaining the same effect on another computer, s/he has to have another embedded data storage device. Specifically, each embedded data storage device is equipped for one computer.

First of all, when the application software of "Dr. eye for Windows 98" is selected and installed on a virtual database and the embedded data storage device is still on the data process apparatus, the software can be seen at the four paths of "programs", "desktop", "add/remove", and "toolbars" at the virtual database as shown in FIGS. 4-a and 4-b. After the embedded data storage device is removed, the virtual database 10 is automatically invisible, and the software at the four paths of "programs", "desktop", "add/remove", and "toolbars" at the virtual database 10 is also invisible. When the embedded data storage device is re-embedded again, the data will be completely restored without any impact. According to the above description, the four paths of "programs", "desktop", "add/remove", and "toolbars", which are the said specific paths, together with all journey and information are concealed, so that all data can be fully secured.

It is, of course, to be understood that the embodiments described herein are merely illustrative of the principles of the present invention and that a wide variety of modifications thereto may be effected by persons skilled in the art without departing from the spirit and scope of the present invention as set forth in the following claims.

What is claimed is:

1. A method with the functions of virtual space and data encryption and invisibility comprising:
   installing an embedded data storage device into a data process apparatus;
   establishing at least one virtual database on the data process apparatus;
   setting up a mode of the virtual database;
   storing a file in the set-up virtual database and encrypting the file;
   detecting if the data process apparatus is still equipped with the embedded data storage device; and
   if the data process apparatus is detected as still equipped with the embedded data storage device, allowing reading of the file in an unencrypted form under a file reading process only and if the data process apparatus is detected as not being equipped with the embedded data storage device, concealing a specific path of the file displayed on the data process apparatus and maintaining the encrypted file.

2. The method with the functions of virtual space and data encryption and invisibility in accordance with claim 1, wherein the embedded data storage device is connected to the data process apparatus through a connection interface.

3. The method with the functions of virtual space and data encryption and invisibility in accordance with claim 2, wherein the connection interface is an IEEE1394.

4. The method with the functions of virtual space and data encryption and invisibility in accordance with claim 2, wherein the connection interface is a USB interface.

5. The method with the functions of virtual space and data encryption and invisibility in accordance with claim 1, wherein the data process apparatus can be selected from any computer controlled hardware platform, such as a PC (Personal Computer), a NB (Notebook), or a PDA (Personal Digital Assistant), a mobile phone or a handheld data process apparatus.

6. The method with the functions of virtual space and data encryption and invisibility in accordance with claim 1, wherein establishing at least one virtual database on the data process apparatus further comprises:
   partitioning an area through a storage space of the data process apparatus; and
   establishing an objective path of the virtual database in the area.

7. The method with the functions of virtual space and data encryption and invisibility in accordance with claim 6, wherein the storage space is a HD (Hard Disk), and the area is logical (virtual) memory blocks.

8. The method with the functions of virtual space and data encryption and invisibility in accordance with claim 1, wherein during establishing at least one virtual database in the data process apparatus, replacing the data process apparatus with the embedded data storage device.

9. The method with the functions of virtual space and data encryption and invisibility in accordance with claim 8, wherein establishing at least one virtual database comprises:
   partitioning an area through a storage space of the data process apparatus; and
   establishing an objective path of the virtual database in the area.

10. The method with the functions of virtual space and data encryption and invisibility in accordance with claim 1, wherein setting up the virtual database includes the following modes: a loaded/unloaded mode, a space management mode, a password mode, and a backup/restore mode.

11. The method with the functions of virtual space and data encryption and invisibility in accordance with claim 10, wherein the loaded/unloaded mode is to enable or disable use of the specific virtual database.

12. The method with the functions of virtual space and data encryption and invisibility in accordance with claim 10, wherein the space management mode enables the user to change the space size of the virtual database.

13. The method with the functions of virtual space and data encryption and invisibility in accordance with claim 10, wherein the password mode provides a rescue password for security controlling if the embedded data storage device is lost; and the password mode further limits specific rescue times and enters into a read-only status of the virtual database.

14. The method with the functions of virtual space and data encryption and invisibility in accordance with claim 10, wherein the backup/restore mode enables data to be made into a backup on the data process apparatus; and the backup/restore model enables data to be restored from the data process apparatus to the virtual database.

15. The method with the functions of virtual space and data encryption and invisibility in accordance with claim 1, wherein storing a file in the virtual database further comprises:
encrypting the file through an encryption mechanism;
copying the specific path through the virtual database; and
moving the specific path to the storage space.

16. The method with the functions of virtual space and data encryption and invisibility in accordance with claim 15, wherein concealing a specific path of the file displayed on the data process apparatus removes the specific path moved to the storage space.

17. The method with the functions of virtual space and data encryption and invisibility in accordance with claim 1, wherein the specific path is information and journey of the file left on the data process apparatus.

18. The method with the functions of virtual space and data encryption and invisibility in accordance with claim 1, wherein the file is a specific item processed by an application program.

19. The method with the functions of virtual space and data encryption and invisibility in accordance with claim 1, wherein the embedded data storage device is one of a portable storage device, an IC (Integrated Circuit) Card, or a smart card.

* * * * *